April 26, 1955  C. A. BARESCH  2,707,132
PNEUMATIC CONVEYOR APPARATUS
Filed Nov. 23, 1951  2 Sheets-Sheet 2
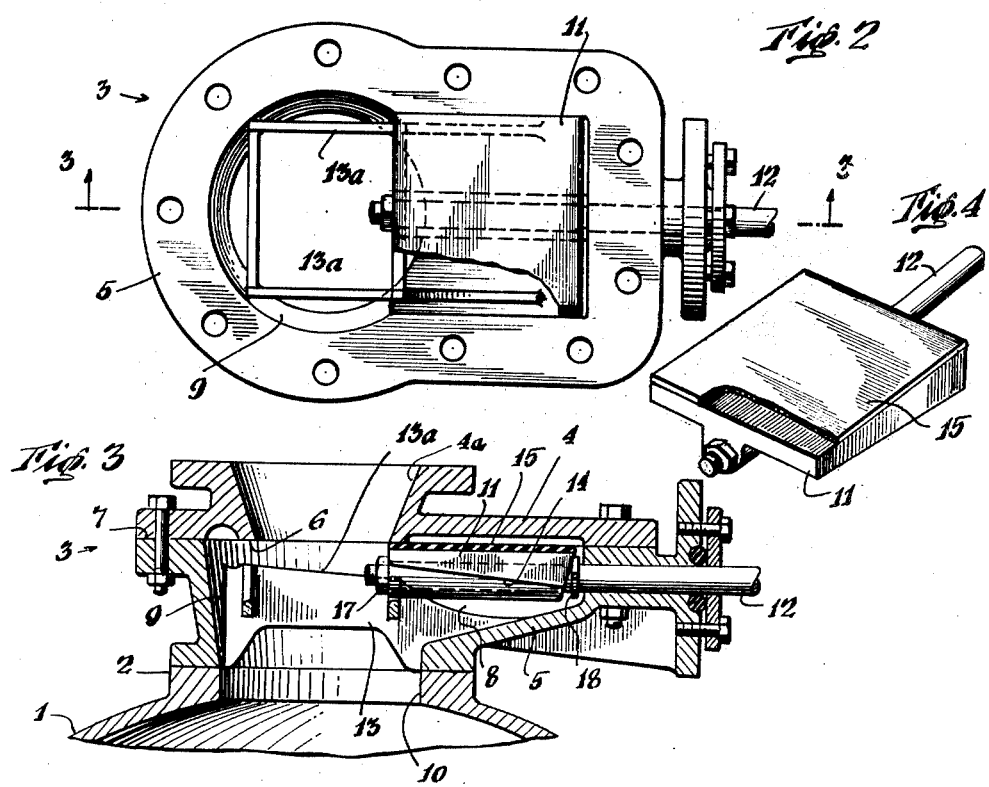
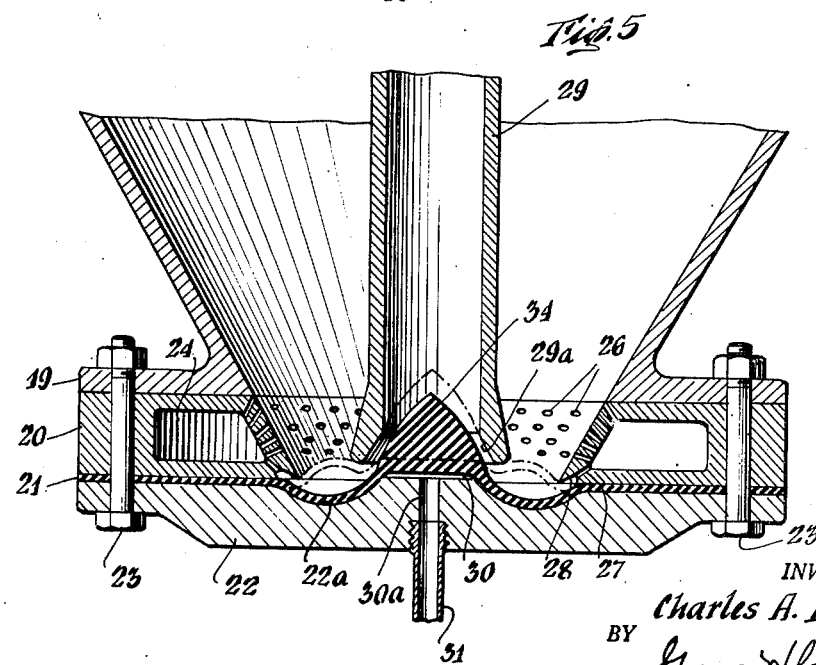
INVENTOR.
Charles A. Baresch
BY George H. Corly
ATTORNEY United States Patent Office 2,707,132
Patented Apr. 26, 1955

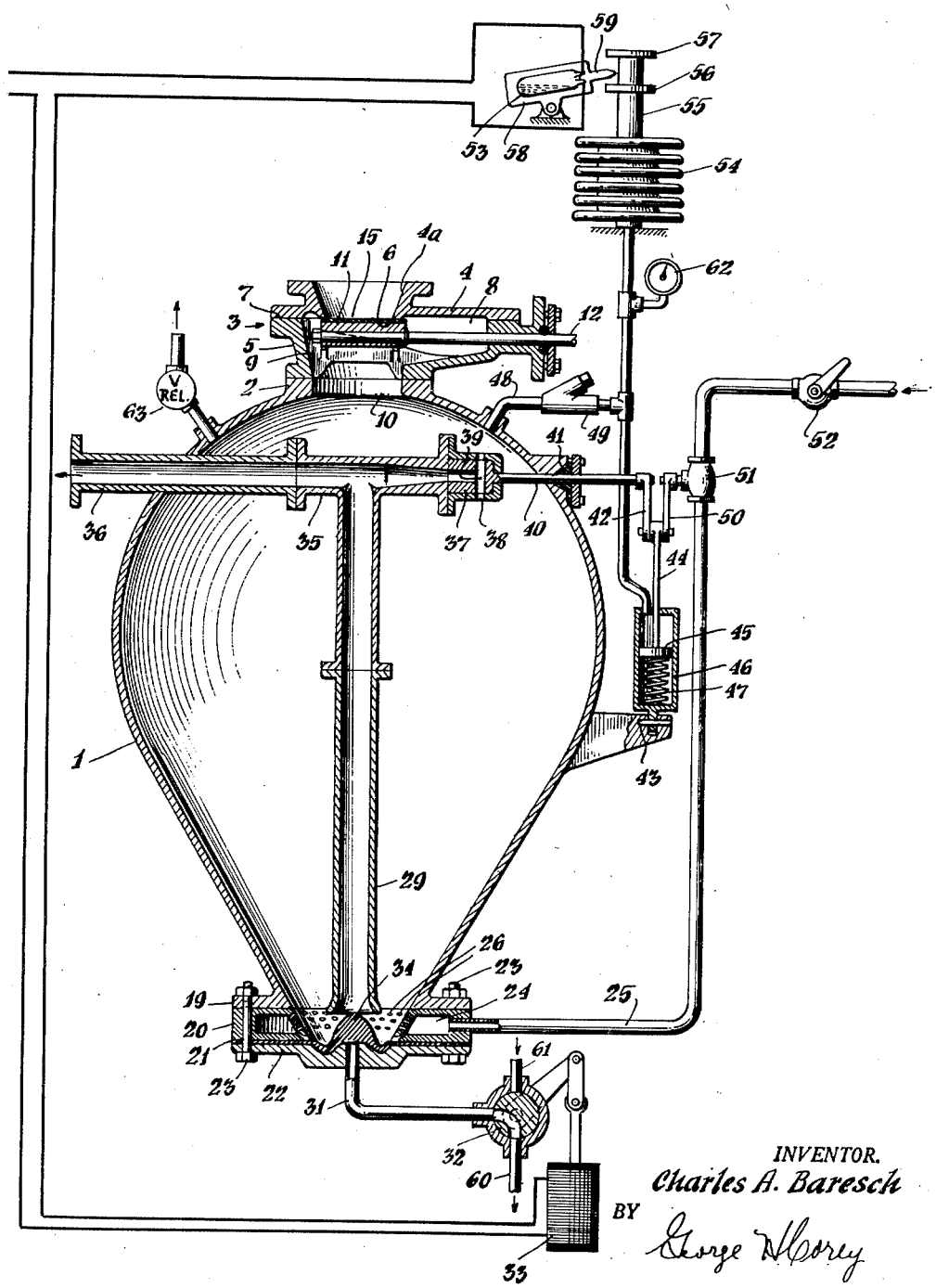

2,707,132

PNEUMATIC CONVEYOR APPARATUS

Charles Albert Baresch, College Point, N. Y.

Application November 23, 1951, Serial No. 257,866

6 Claims. (Cl. 302—53)

The present invention relates to pneumatic conveyor apparatus, and particularly to apparatus for conveying powdered or granular materials.

Pneumatic conveyor systems for such materials may be classified as either low pressure continuous systems or high pressure intermittent systems. In a low pressure system, the powdered material is continuously fed into a moving stream of air. Since this material must be fed into the air stream against the fluid pressure therein, that pressure is limited. The distance through which material can be conveyed in a pneumatic conveyor system is limited by the pressure. A high pressure system is therefore inherently capable of conveying material over greater distances than a low pressure system. A high pressure system commonly includes an intake unit which is supplied with a charge of powdered material while the system is not under pressure. After being charged, this intake unit is closed and air under pressure is then supplied to it to mix the air with the powdered material and eject it through the discharge line. The pressure in such a system is limited only by the mechanical strength of the component parts, and the distance through which the material can be conveyed is limited only by the pressure.

The present invention is concerned principally with an improved intake unit for a high pressure system of the type described.

An object of the present invention is to provide an improved gate or intake valve for controlling the flow of powdered material into such an intake unit.

Another object of the invention is to provide an improved valve mechanism for controlling the discharge of the mixture of powdered material and air from the unit.

A further object of the invention is to provide an improved mechanism responsive to the pressure in the casing in the intake unit for controlling the unit so as to prevent clogging of the discharge line.

A further object is to provide apparatus of the type described which is very compact and which has a low overall height.

The foregoing and other objects of the invention are accomplished by providing an intake unit with a casing having a generally spherical upper portion and a generally conical lower portion. Mounted on the top of the casing is a material intake valve or gate, which includes a flat gate member moving horizontally across a downwardly facing seat. As it nears its closed position, this gate engages wedging surfaces which force it upward, tightly against the seat. The upper face of the valve is covered with wear-resistant material.

The bottom of the casing is closed by a diaphragm having a peripheral convolution and a central convex valve member on its upper surface. The discharge conduit extends vertically within the casing and has its lower or inlet end downwardly flared to cooperate with the convex valve member carried by the diaphragm. The diaphragm is contoured with relation to adjacent air inlet passages so as to provide a smooth flow of air and material into the discharge conduit.

Inside the casing near its upper end is provided a by-pass valve opening from the interior of the casing into the discharge conduit. This valve is normally closed, but is opened by a pressure responsive mechanism when the pressure in the casing exceeds a predetermined value indicative of clogging of the discharge line. This by-pass then supplies relatively clean air to the discharge line to eliminate the clogging condition. This pressure responsive mechanism also controls a valve in the air supply line to shut off the latter if casing pressure gets too high.

Other objects and advantages of the invention will become apparent from a consideration of the following specification, together with the accompanying drawings.

In the drawings,

Fig. 1 is a cross-sectional elevation of an improved intake unit constructed in accordance with the invention, showing certain parts of the control system somewhat diagrammatically.

Fig. 2 is a plan view, on an enlarged scale, of the material inlet valve, with part of the casing removed.

Fig. 3 is a vertical sectional view, taken on the line 3—3 of Fig. 2.

Fig. 4 is a perspective view of a gate structure forming part of the inlet valve.

Fig. 5 is a fragmentary cross-sectional view, showing on an enlarged scale the improved discharge valve construction.

Referring now to the drawings, there is shown a casing 1 having a spherical upper portion and a generally conical lower portion. The top of the casing 1 is provided with an annular mounting pad 2 on which is mounted by any suitable means (not shown) a feed valve mechaism generally indicated by the numeral 3.

The feed valve 3 comprises an upper casting 4 and a lower casting 5. The upper casting 4 includes a downwardly convergent inlet passage 4a. This inlet passage 4a terminates at a downwardly facing seat 6, which is on the same plane as the parting plane 7 between the two castings 4 and 5. The seat 6 and the parting plane surface on the upper casting 4 may therefore be machined at the same time.

The lower casting 5 is formed with a gate chamber 8 substantially larger than the lower end of the inlet passage 4a. The gate chamber 8 communicates with a downwardly convergent discharge passage 9 which in turn communicates with an inlet opening 10 extending through the mounting pad 2 on the casing 1.

A gate 11 is located within the chamber 8 and moves horizontally between the closed position shown in Fig. 1 and an open position shown in Figs. 2 and 3. The gate 11 is operated by a stem 12 which extends outwardly through the casting 5. The outer end of the stem 12 may be provided with suitable operating mechanism (not shown) such as a pneumatic cylinder or a manually operated rack and pinion mechanism.

The casting 5 is provided with a pair of transverse webs 13 whose upper surfaces are machined to form inclined planes 13a, facing the seat 6 but spaced laterally therefrom so as to be out of alignment with the powdered material falling through the inlet passage 4a. The bottom of the gate 11 is provided with a pair of wedging surfaces 14 which engage the inclined planes 13a as the gate 11 approaches its closed position. Through the action of these wedges 14 and the inclined planes 13a, the gate 11 is forced upwardly into tight engagement with the seat 6, this upward movement of gate 11 being permitted by the inherent flexibility of the stem 12. The upper surface of the gate 11 is covered with a layer 15 of wear-resistant material, for example, a wear-resistant rubber compound of a type similar to that used in tire treads.

It should be noted that the inner surfaces of the castings 5 and 6 are all downwardly inclined so that any powdered material which engages them will pass on into the intake unit and will not remain within the feed valve casing. The webs 13 span the gate chamber and have their ends beyond the machined planes 13a contoured to prevent an accumulation of material on their upper surfaces. The webs 13 and the inclined planes 13a are spaced laterally from the sides of the casting 5, so that they do not form shelves on which the powdered material can accumulate. The lateral face of gate 11 nearest the casting 5 is beveled so that no material will be compressed between it and the casting during an opening movement of the gate.

The gate 11 is fastened on the stem 12 between a nut 17 threaded on the end of the stem and a snap ring 18, which forms a shoulder against which the gate 11 is held by the nut 17. The gate may be easily replaced, which is occasionally required because of the wear on its upper surface.

The lower end of the casing 1 is formed with a flange 19 to which is attached an air inlet casting 20. The casting 20 is provided with a central conical opening which forms a continuation of the conical interior surface of the casing 1. The lower end of this opening is closed by a diaphragm 21 clamped between the air inlet casting 20 and a backing member 22. Bolts 23 hold the backing member 22, the diaphragm 21, the air inlet casting 20 and the flange 19 in assembled relationship.

The air inlet casting 20 is provided with an annular chamber 24 which extends completely around the casing 1 and is connected with an air inlet pipe 25. The inner wall of the air inlet casting is provided with a number of upwardly directed apertures 26 and with a single row of downwardly directed apertures 27 which communicate with a peripheral groove 28 extending around the lower surface of the air inlet casting 20 and spaced slightly from the lower edge of the inner conical surface of that casting.

The backing member 22 has in its upper surface an annular convolution 22a whose outer diameter is just slightly greater than the outer diameter of the groove 28. A discharge conduit 29 extends vertically within the casing 1 and is provided at its lower end with a flared inlet 29a whose inner diameter is substantially the same as the inner diameter of the convolution 22a in the backing member 22.

Between the diaphragm 21 and the backing member 22 is an expansible chamber 30 connected through an aperture 30a in the backing member 22 with an air supply pipe 31. The flow of compressed air through the pipe 31 is controlled by a valve 32 operated by an electromagnet 33.

The diaphragm 21 carries a convex valve member 34 in the middle of its upper surface. When the chamber 30 is supplied with air under pressure, the diaphragm 21 is moved upwardly to the position shown in dotted lines in Fig. 5, so that its periphery closes the groove 28 and the valve member 34 closes the flared inlet end 29a of the discharge conduit 29. When the chamber 30 is vented, the diaphragm 21 collapses against the backing member 22, opening an annular path for the flow of air mixed with powdered material into the flared inlet 29a past the valve member 34. The diaphragm 21 then takes up a position against the convolution 22a of the backing member 22 and forms a smoothly curved path for air flowing out of the groove 28 across the diaphragm and into the annular inlet around the valve 34. Any powdered material which falls to the bottom of the casing without having been thoroughly aerated and dry fluidized by air flowing from the openings 26 is completely fluidized by being mixed with the air flowing from the groove 28 across the diaphragm 21 into the discharge conduit 29. The upper end of conduit 29 is connected through one arm of a T-connection 35 with an extension 36 of the discharge conduit which passes out through the casing 1 and through the other arm of the T-connection with a by-pass valve 37. As illustrated in the drawing, the valve 37 is a plug type valve shown in the drawing in its open position in which air may flow through ports 38 in the valve casing and a passage 39 in the valve into the end of the T-connection 35. The valve 37 is rotatable by means of a stem 40 from the open position shown to a closed position in which the passage 39 is out of alignment with the ports 38. The valve stem 40 passes out of the casing through a suitable packing gland 41, and is provided on its outer end with a crank arm 42 by which it may be rotated. The crank arm 42 is pivoted on a piston rod 44 operated by a piston 45 which moves in a cylinder 46, and is biased toward the upper end of the cylinder by a spring 47. The lower end of the cylinder is pivoted at 43.

Air under pressure from the casing 1 is supplied to the upper end of cylinder 46 through a conduit 48 having a filter 49 inserted therein. The piston rod 44 also operates another crank arm 50 which controls a valve 51 regulating the supply of air through the conduit 25 to the air inlet casting 20. A manually operated air valve 52 of conventional construction is provided in the conduit 25 upstream from the valve 51.

The electromagnet 33 which operates air valve 32 is controlled through a circuit which includes a switch 53 operated by a bellows 54 in response to the pressure inside the casing 1. The switch 53 is illustrated as being a mercury switch supported on a frame 58 mounted on a friction pivot so that it tends to remain in any angular position to which it is moved. Bellows 54 operates a rod 55 having a pair of spaced flanges 56 and 57, which may be adjustable along the rod. The frame 58 has a finger 59 which extends between the flanges 56 and 57. When the pressure in casing 1 and hence in bellows 54 exceeds a predetermined value, the flange 56 is moved upwardly to engage the finger 59 and rotate the mercury switch 53 toward its open position. The valve 32 is a two-position valve, and is arranged to connect the conduit 31 to a vent 60 when the electromagnet 33 is de-energized. When the electromagnet 33 is energized, the valve 32 is moved to connect the conduit 31 to an air supply conduit 61.

When the pressure in bellows 54 falls below a second predetermined value, lower than the value at which the switch 53 was opened, then the flange 57 moves downwardly far enough to engage finger 59 and rotate the frame 58 to close the switch 53.

A pressure gage 62 is provided so that the operator may observe the pressure in casing 1 at all times. A safety valve 63 is also provided to limit the maximum casing pressure.

Operation

Under starting conditions, the casing 1 is empty, the pressure therein is low (atmospheric) so that the bellows 54 has closed the mercury switch 53 and the electromagnet 33 is energized to move the valve 32 to connect the air supply to the chamber 30, so that the discharge valve 34 is closed. The manually operated air supply valve 52 is also closed. Since the pressure in chamber 1 is low, the automatic air valve 51 is open and the by-pass valve 37 is closed. The gate 11 is normally closed.

To start the unit in operation, the gate 11 is opened for a length of time sufficient to charge the casing 1 with a load of powdered material which is to be conveyed through the conduit 36. The quantity of material may be controlled either automatically or manually in any suitable manner. After the desired quantity of material has been supplied to the casing 1, the gate 11 is closed and the manual air valve 52 is opened to admit air under pressure to the chamber 24 within the air inlet casting 20, from which it issues through the openings 26 and mixes with the powdered material to aerate and fluidize it. The admission of this air gradually raises the pressure within the casing 1. As soon as the pressure within the casing reaches the normal operating pressure, the bellows 54 operates the switch 53 to its open position and the electromagnet 33 is de-energized, operating the valve 32 to vent the chamber 30 to atmosphere, thereby allowing the valve 34 to be opened by the pressure in the casing and the weight of the material acting downwardly on the diaphragm 21. The air under pressure in casing 1 co-operates with the air sweeping from the groove 28 across the diaphragm 21 to move the mixture of powdered material and air upwardly through the discharge conduit 29 and out through the conduit 36. This material proceeds through that conduit to the final discharge point, where suitable filter apparatus is provided for separating the powdered material from the air. Any of several well-known forms of apparatus may be used for that purpose.

Under normal conditions, the operation will continue with the discharge valve 34 open, the by-pass valve 37 closed and the air supply valve 51 open, until the load of material in the casing is completely discharged. As the quantity of material in the casing is reduced, the resistance to flow through the discharge line falls off and the casing pressure likewise falls. When the casing is empty this back pressure will be substantially zero (atmospheric). The operator, noting that pressure gage indicates almost zero, will then close the valve 52. Then the residual fluid under pressure (perhaps one or two pounds per sq. in.) in the casing will flow out through the discharge line until the casing pressure is substantially zero. At this time, the bellows 54 closes the switch 58 to energize the electromagnet 33 and operate valve 32 to restore pressure to the chamber 30 and close the discharge valve 34. The casing is then ready for a new charge of material.

If at any time while the unit is operating the discharge line should become clogged, the pressure within the casing 1 will rise substantially above the normal operating pressure. This pressure will act on the piston 45 and move it against the spring 47, rotating the crank 42 and thereby turning the stem 40 to open the by-pass valve 37. The by-pass valve 37 receives air from the top of the casing 1 where there is relatively little powdered material mixed with the air, so that the air forced into the discharge line through valve 37 is relatively lightly loaded with material and consequently aids in removal of any deposit of material which is clogging the discharge conduit. If the clogged condition of the discharge conduit continues, the air pressure in casing 1 continues to increase and the by-pass valve moves more and more toward its fully open position. As the by-pass valve opens, the air valve 51 closes, and when the by-pass valve reaches its fully open position, the air valve is fully closed. The closing of valve 51 may be started simultaneously with the opening of by-pass valve 37, or at any other suitable point in the movement of valve 37. The capacities of the two valves may be made substantially different. Usually the by-pass valve will have a greater capacity since the pressure differential across it is lower. Consequently, under extreme conditions of clogging of the discharge line, the air supply will be cut off from the casing 1 and the inlet end of the discharge line will be vented to the casing above the pile of material therein, where the air is relatively clean. The pressure in the casing remains constant until such time as the clogged line clears itself. It has been found that the holding of such a steady high pressure on the line without the addition of more air or powdered material to the line will eventually clear the plug of deposited material. The plug itself is structurally weak and is unable to resist this high pressure for any length of time, so that it is eventually blown on through the line. As soon as the plug is cleared, the pressure in the casing falls again. As it falls, the by-pass valve is gradually closed and the air supply valve 51 is gradually opened, until the unit assumes its normal operating condition.

When a clogging condition less severe than a complete plug occurs, the opening movement of by-pass valve 37 and the closing movement of valve 51 are arrested whenever the rate of discharge of air from the casing just equals the rate of supply, so that the casing pressure stops increasing.

In describing the apparatus, reference has been made to the use of powdered material and granular material. These terms have been used in their generic sense and not by way of limitation. The apparatus described and claimed herein is suitable for use with a wide variety of more or less finely divided materials, and it is not intended by the use of phrases such as "powdered material" to limit the invention to the use of materials of any particular particle size or range of sizes.

I claim:

1. A material intake unit for a pneumatic system for conveying powdered materials, comprising a casing having a powdered material inlet, an air inlet and a mixture outlet, means for closing said powdered material inlet, means for supplying compressed air to said air inlet, a discharge conduit including a portion within said casing and connected to said outlet to receive said mixture therefrom, a by-pass conduit opening at one end into said casing adjacent the top thereof and at its opposite end into said portion of the discharge conduit, a normally closed by-pass valve in said by-pass conduit, and means responsive to the pressure in said casing for opening said by-pass valve when said pressure exceeds a predetermined value.

2. A material intake unit for a pneumatic system for conveying powdered materials, comprising a casing having a powdered material inlet, an air inlet in the bottom of the casing and a mixture outlet adjacent the bottom of the casing, means for closing said powdered material inlet, means including a valve for supplying compressed air to said air inlet, a discharge conduit connected to said outlet to receive said mixture therefrom, a by-pass conduit opening at one end into said casing adjacent the top thereof and at its opposite end into said discharge conduit, a by-pass valve in said by-pass conduit, said by-pass valve being normally closed, and means responsive to the pressure in said casing for simultaneously moving said by-pass valve in an opening direction and said air supply valve in a closing direction when said pressure exceeds a predetermined value, the closing movement of the air supply valve being then effective to reduce the motion of the material within the casing so that the air entering the by-pass conduit at the top of the casing has less entrained material.

3. A material intake unit for a pneumatic system for conveying powdered material, comprising a casing having a downwardly convergent lower portion of circular cross-section and an inlet for powdered material in its upper portion, means for closing said inlet, means for supplying air under pressure to said casing, a discharge conduit extending vertically and centrally within said casing and having its inlet end adjacent and opening toward the bottom of the casing, a flexible diaphragm extending across the bottom of the casing, means defining an expansible chamber beneath said diaphragm including said diaphragm and a backing member having a peripheral convolution, an upwardly convex valve member attached to the center of said diaphragm on its upper side, and means for controlling the pressure in said chamber including a member movable between a first position in which fluid under pressure is supplied to said chamber to move the diaphragm and valve upwardly to seat said valve member against said inlet end of the discharge conduit, and a second position in which said chamber is vented so that the diaphragm moves downwardly against said backing member to open said discharge conduit, said backing member having its convolution contoured so that when said diaphragm lies against it, the diaphragm has a similar convolution whose outer diameter is slightly greater than the inner diameter of the lower end of the casing and whose inner periphery merges smoothly with the surface of said convex valve member, said diaphragm and valve member defining a smoothly contoured path for powdered material moving down the wall of said conical casing, across said diaphragm and up through said discharge conduit.

4. A material intake unit for a pneumatic system for conveying powdered material, comprising a downwardly convergent casing having an inlet for powdered material, means for closing said inlet, means for supplying air under pressure to said casing, a discharge conduit extending vertically within said casing and having a flared inlet end adjacent and opening toward the bottom of the casing, a flexible diaphragm extending across the bottom of the casing, means including said diaphragm defining an expansible chamber beneath it, an upwardly convex valve attached to said diaphragm on its upper side, and means for controlling the pressure in said chamber including a member movable between a first position in which fluid under pressure is supplied to said chamber to move the diaphragm and valve upwardly to seat said convex valve against said flared inlet end of the discharge conduit and a second position in which said chamber is vented so that the diaphragm moves downwardly to open said discharge conduit.

5. A material intake unit for a pneumatic system for conveying powdered material, comprising a casing having downwardly convergent lower walls forming a mixing chamber of circular cross-section and an inlet for powdered material in the upper portion of said chamber, means for closing said inlet, means for supplying air under pressure to said casing including a groove in the lower face of the casing wall adjacent but slightly spaced from the inner surface thereof, and apertures in the casing wall for conveying air under pressure to said groove, a discharge conduit extending vertically and centrally within said casing and having its inlet end adjacent and opening toward the bottom of the casing, a flexible diaphragm extending across the bottom of the casing and having its edges clamped to the casing wall outside said groove, means defining an expansible chamber beneath said diaphragm including said diaphragm and a backing member having a peripheral convolution, an upwardly convex valve member attached to the center of said diaphragm on its upper side, and means for controlling the pressure in said chamber including a member movable between a first position in which fluid under pressure is supplied to said chamber to move the diaphragm upwardly to close said groove and said valve member upwardly against said inlet end of the discharge conduit and thereby close the discharge conduit, and a second position in which said chamber is vented so that the diaphragm moves downwardly against said backing member to open said groove and said discharge conduit, said backing member having its convolution contoured so that when said diaphragm lies against it, the diaphragm takes the form of a similar convolution whose outer diameter is slightly greater than that of the groove and whose inner periphery merges smoothly with the surface of said convex valve member, said diaphragm and valve member defining a smoothly contoured path for powdered material moving across said diaphragm through said discharge conduit.

6. A material intake unit as defined in claim 5, in which said air supplying means includes an air conduit extending around the periphery of the lower end of said casing wall, and said apertures provide communication between the conduit and the groove, said casing wall having additional apertures opening into said conduit and directed upwardly in said mixing chamber so that air flowing therefrom tends to aerate and fluidize the powdered material therein.

References Cited in the file of this patent

UNITED STATES PATENTS

| | | |
|---|---|---|
| 1,549,285 | Baker | Aug. 11, 1925 |
| 1,566,517 | Bergman | Dec. 22, 1925 |
| 1,889,163 | Vogel-Jorgensen | Nov. 29, 1932 |
| 1,935,843 | Goebels | Nov. 21, 1933 |
| 1,970,964 | Hosmer | Aug. 21, 1934 |
| 2,027,697 | Nielsen | Jan. 14, 1936 |
| 2,152,367 | Smith | Mar. 28, 1939 |
| 2,221,741 | Vogel-Jorgensen | Nov. 12, 1940 |
| 2,318,576 | Arnold | May 11, 1943 |
| 2,433,726 | Angell | Dec. 30, 1947 |
| 2,596,817 | McGovney | May 13, 1952 |

FOREIGN PATENTS

| | | |
|---|---|---|
| 629,935 | Germany | Apr. 21, 1935 |
| 669,654 | Germany | May 4, 1935 |

OTHER REFERENCES

The Link Belt Roto, Louvre Dryer, Book 1911, page 18.